United States Patent
Müller et al.

(10) Patent No.: US 8,727,281 B2
(45) Date of Patent: May 20, 2014

(54) CONDENSED WATER DECREASING INSULATION PACKAGE FOR THERMAL AND ACOUSTIC INSULATION OF A VEHICLE CABIN

(75) Inventors: Rainer Müller, Rosengarten (DE); Robert Redecker, Hamburg (DE)

(73) Assignee: Airbus Operations GmbH (DE)

( * ) Notice: Subject to any disclaimer, the term of this patent is extended or adjusted under 35 U.S.C. 154(b) by 22 days.

(21) Appl. No.: 13/564,870

(22) Filed: Aug. 2, 2012

(65) Prior Publication Data

US 2013/0020434 A1   Jan. 24, 2013

Related U.S. Application Data

(63) Continuation of application No. PCT/EP2011/051414, filed on Feb. 1, 2011.

(60) Provisional application No. 61/300,626, filed on Feb. 2, 2010.

(30) Foreign Application Priority Data

Feb. 2, 2010  (DE) .......................... 10 2010 006 564

(51) Int. Cl.
  *B64C 1/40*   (2006.01)
(52) U.S. Cl.
  USPC ......................................... 244/131; 244/121
(58) Field of Classification Search
  USPC ....... 244/121, 129.1, 129.2, 131, 119, 117 R, 244/117 A, 1 N, 1 A; 52/404.2, 506.1
  See application file for complete search history.

(56) References Cited

U.S. PATENT DOCUMENTS

| | | | | |
|---|---|---|---|---|
| 5,811,168 A * | 9/1998 | Rasky et al. | | 428/102 |
| 5,827,598 A * | 10/1998 | Larsen et al. | | 244/131 |
| 5,866,231 A | 2/1999 | Bodin et al. | | |
| 7,059,565 B2 * | 6/2006 | Scown et al. | | 244/131 |
| 7,584,582 B1 * | 9/2009 | Hutter, III | | 52/404.2 |
| 2004/0175516 A1 | 9/2004 | Schmitz et al. | | |
| 2008/0308676 A1 | 12/2008 | Muller | | |
| 2009/0090812 A1 | 4/2009 | Boock et al. | | |

FOREIGN PATENT DOCUMENTS

| | | | |
|---|---|---|---|
| DE | 10 2004 057 289 A1 | 8/2005 | |
| EP | 0845409 A2 | 6/1998 | |
| FR | 2685756 A1 | 7/1993 | |
| FR | 2878601 A1 | 6/2006 | |
| WO | WO 2007131583 A1 * | 11/2007 | |

* cited by examiner

*Primary Examiner* — Tien Dinh
*Assistant Examiner* — Richard R Green
(74) *Attorney, Agent, or Firm* — Lerner, David, Littenberg, Krumholz & Mentlik, LLP

(57) ABSTRACT

An insulation package for thermal and acoustic insulation of a vehicle cabin has a cutout to allow a fastening device to pass through. An insulating element that is disposed in an area of the insulation package surrounding the cutout has an opening corresponding to the cutout for allowing a fastening device to pass through. At least part of the insulating element is aligned perpendicularly to an axis of the passthrough in the cutout and conformed so as to create a gap between a fastening device that has passed through and the insulation package. In this way, condensed water may be prevented from passing through the cutout in the insulation package and into the aircraft cabin.

11 Claims, 9 Drawing Sheets

Fig. 1a

Prior Art

Fig. 1b

Prior Art

Fig. 1c

Prior Art

CONDENSED WATER DECREASING INSULATION PACKAGE FOR THERMAL AND ACOUSTIC INSULATION OF A VEHICLE CABIN

CROSS-REFERENCE TO RELATED APPLICATIONS

The present application is a continuation of International Application No. PCT/EP2011/051414 filed Feb. 1, 2011, published in German, which claims priority from German Patent Application No. 10 2010 006 564.1, filed Feb. 2, 2010, and US Provisional Patent Application No. 61/300,626, filed Feb. 2, 2010, the disclosures of which are incorporated herein by reference.

TECHNICAL FIELD

The invention relates to an insulation package for thermal and acoustic insulation of a vehicle cabin, having a cutout to allow a fastening device to pass through. The invention further relates to the use of an insulating element that is attachable to an insulation package and an aircraft having a fuselage, a cabin with cabin components, and an insulation structure comprising at least one insulation package for thermal and acoustic insulation of the aircraft cabin.

BACKGROUND OF THE INVENTION

In order to fasten components in vehicle cabins, a variety of fastening devices are used in the prior art. For example, for components in aircraft cabins, fastening devices are used that may be attached to a primary fuselage structure using suitable connecting means. Then, cabin components such as side panels, galleys, hatracks, partition walls or other components may be installed on these fastening devices during manufacturing of the aircraft.

An insulating structure for thermal and acoustic insulation of the aircraft cabin is usually located between the aircraft cabin and the fuselage structure. Insulation also reduces the risk of condensed water forming on the aircraft fuselage structure. However, since it is not possible to prevent an exchange of air between the relatively moist cabin air and the intermediate space between the insulating structure and the aircraft fuselage, condensed water forms on the inside of the aircraft fuselage despite the insulation. The impermeability of the insulation generally ensures that the condensed water remains behind the insulation and does not get into the cabin. In order to be able to secure the cabin components to the fastening devices, it is necessary to provide cutouts in the insulation, through which the fastening devices protrude from the aircraft fuselage into the cabin. This creates the possibility that condensed water may infiltrate the aircraft cabin from the outer skin. Moreover, since not all cabin components can be entirely impermeable, and gaps may exist between adjacent cabin components, which cannot be rendered completely impermeable at all points using seals, condensed water may get into the cabin. In unfavorable cases, the areas of the insulation concerned are located above passenger seats, with the result that condensed water may drip onto the passengers below. This phenomenon is also called "rain in the plane".

BRIEF SUMMARY OF THE INVENTION

Accordingly, an aspect of the invention consists in suggesting an insulation package for thermal and acoustic insulation of a vehicle cabin having a cutout to allow a fastening device to pass through, with which condensed water is prevented from getting into a vehicle cabin to the extent possible.

A further aspect of the invention consists in suggesting an aircraft having a fuselage, a cabin with cabin components and fastening devices for retaining cabin components in the fuselage, in which the phenomenon of penetration by condensed water into the aircraft cabin is eliminated or at least reduced.

According to a first aspect of the invention, an insulation package comprises an insulating element that is disposed in an area of the insulation package surrounding the cutout, and an opening corresponding to the cutout to allow a fastening device to pass through. At least part of the insulating element is aligned perpendicularly with an axis of the passthrough in the cutout and conformed so as to create a gap between a fastening device that has passed through and the insulation package.

Such an insulation package according to an embodiment of the invention prevents the passage of condensed water in the area of the passthrough for the fastening device and enables the condensed water to be guided in a controlled manner around the bracket behind the insulation package. In this way, condensed water that might have been able to come into contact with the fastening device and run along the bracket to drip into the cabin is guided past the fastening device at a certain distance therefrom by the insulating element, so that this danger may be avoided.

This effect is particularly evident if at least part of the fastening device extends into the cabin in the direction of gravity.

The actual design of the insulating element is relatively arbitrary, geometrically simple shapes would be preferable, for example a rectangle with optionally rounded corners. Any number of other shapes is also conceivable, provided they do not limit the scope of protection.

In an advantageous improvement, the insulating element is placed on an envelope foil of an insulating material. In this way, it is possible for conventional insulation packages to be adapted easily, since little or no modifications are necessary in order to convert a conventional insulation package into an insulation package according to the invention.

In an advantageous improvement, the insulating element is enclosed in an envelope foil and integrated in an insulating material. This is particularly space saving and advantageous, but this would entail the modification of known insulation packages or packages that are already present.

In an advantageous improvement, the insulating element has at least one spacer. With the use of a spacer it is possible to exercise greater control when guiding the flow of condensed water behind the fuselage insulation. Multiple spacers may also be used, and may be placed for example at all corners of the insulating element. The actual design of a spacer is also relatively arbitrary, although mechanically simple projections would be particularly advantageous for use as spacers.

In an advantageous improvement, the spacer has the form of a collar that extends around at least part of the periphery. Such an arrangement is easy to manufacture and is particularly effective.

In a similarly advantageous improvement, the spacer extends outwardly from the insulation package. In this way, the gap between the fastening device and the insulation package is created simply.

In an advantageous improvement, the insulation package at least partly forms a groovelike shape in the area surrounding the cutout. Due to the groovelike shape, a kind of dam is effectively created, which keeps the condensed water away from the cutout in the insulation package, and also ensures that the condensed water is unable to pond. The effect of this would again be that condensed water would be able to get into the area of the cutout, which in turn would result in condensed water being able to enter the cabin through the cutout, depending on the configuration and installation of the insulating member. Through the skilful arrangement of the spacer or collar, condensed water is able to drain into a base of the vehicle on an inner side of the insulation.

In an advantageous improvement, at least part of the insulating element has a shape that tapers progressively with increasing distance from a top side of the insulation package. This is a mechanically very simple design of an insulating element, which enables particularly easy flow movement of the condensed water around the fastening device, so that the cutout in the insulation package is not exposed to condensed water. In a particularly preferred embodiment, the insulating element might be designed in the form of a pyramid, for example.

In an advantageous improvement, the insulation package comprises at least one protective film, which is constructed such that it is securable to a structure of the vehicle, so that the insulating element and the opening or cutout are shielded from the fuselage. In this way, condensed water that is located on the vehicle structure and may flow along the fastening device may be prevented from doing so. This protective film, which functions as a drip catcher, may be manufactured from various film materials. For example, materials such as polyethylene (PET), polyvinylidene fluoride (PVDF), polyvinyl fluoride (PVF), polyether ether ketone (PEEK) and other films that are routinely used in vehicle construction would be eligible for consideration.

In an advantageous improvement, at least two such protective films are provided in the insulation package according to an embodiment of the invention, located on opposite sides of the insulating element and configured such that they are able to be secured to a structure of the vehicle.

In an advantageous improvement, the insulating element is made from a closed-cell foam. In this context, polyethylene, polyurethane or polyolefin foams would be conceivable, for example. While open-cell foams may have the advantage that the condensed water formed could be collected, which may thus prevent the condensed water from penetrating for a certain period, this would only be assured until the absorption capacity of the open-cell foam was reached. The disadvantage of open-cell foam would be that such material would accumulate condensed water in the area of the fastening device, which may result in additional weight and corrosion in the area of the fastening device.

An aspect of the present invention includes an insulating element that is attachable to an insulation package in order to reduce the entry of condensed water into a vehicle cabin.

Another aspect of the present invention includes a fastening device for accommodating an insulating element, wherein the insulating element has the features and advantages described in the preceding. The fastening device according to an embodiment of the invention is characterized by at least one protrusion that is configured to support an insulating element in at least one direction relative to the retaining device. Such a protrusion may be formed for example as a shoulder or a type of collar that prevents an insulating element from slipping over this protrusion.

In an advantageous improvement of the fastening device according to an embodiment of the invention, two protrusions are provided that are preferably at a distance from one another. The distance between these two protrusions is configured to enable accommodation of an insulating element according to the invention. In this way, the position of the insulating element is always constant relative to the fastening device, so that when an insulating element is permanently bonded to the insulation package, for example, additional devices and means for retaining the insulating element or the insulation package attached thereto are unnecessary.

The further advantage of a fastening device of such kind according to an embodiment of the invention consists in that a sealing function is created between the protrusion and the insulating element, which further helps to prevent condensed water from penetrating or passing through.

The at least one protrusion preferably extends completely around the fastening device according to an embodiment of the invention, so that improved support for the insulating element is achieved.

A base area of the protrusion of the fastening device is preferably rounded, so that the immediately adjacent insulation package is not affected thereby. For this purpose, an oval or elliptical shape is particularly recommended, if the fastening device has a flat design, for example.

Similarly, other aspects of the present invention include an aircraft having a fuselage, a cabin with cabin components and fastening devices for retaining the cabin components in the fuselage, wherein the aircraft fuselage is equipped with an insulation arrangement including at least one insulation package having the features described in the preceding.

BRIEF DESCRIPTION OF THE DRAWINGS

Additional features, advantages and application options of the present invention will become apparent from the following description of the embodiments and the figures. In this context, all features described and/or illustrated constitute the various embodiments of the invention both individually and in any combination regardless of their composition in the individual claims or their references. Also in the figures, identical or similar items are designated with the same reference numbers.

DETAILED DESCRIPTION

Figure 1A:
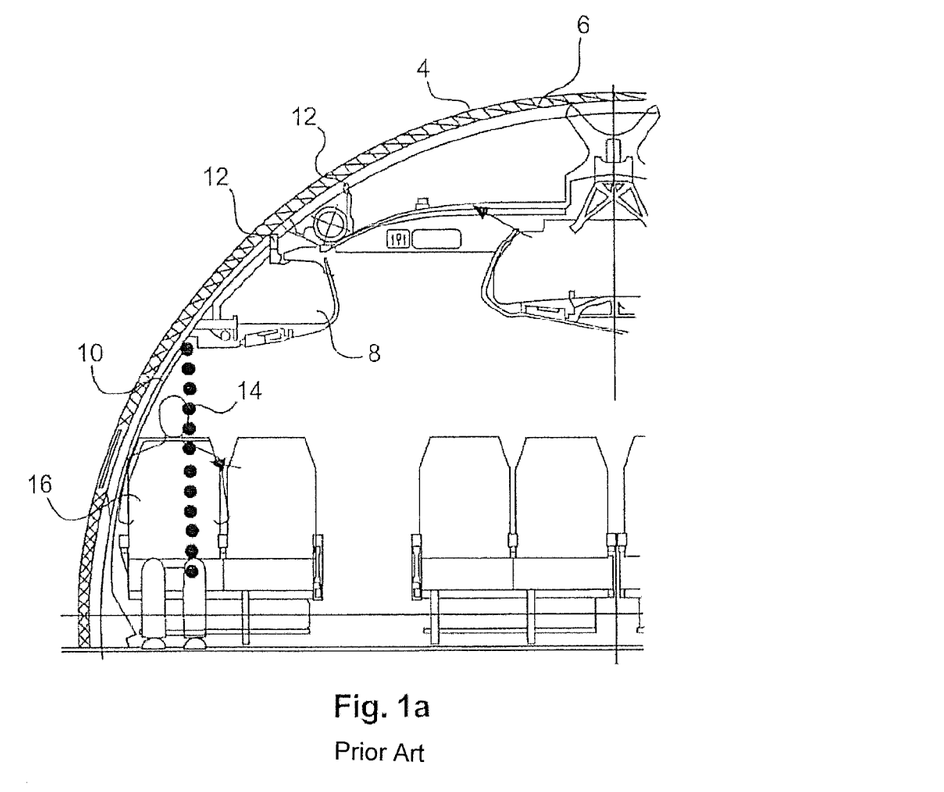
FIGS. 1a-1c show an insulation structure and fastening device in an aircraft fuselage according to the prior art.

In FIG. 1a, a cross section through an aircraft cabin 2 is shown that is surrounded by a fuselage 4 that is equipped with an insulating arrangement 6. A plurality of cabin components, such as a hatrack 8 and a cabin side panel 10, are arranged on fastening devices 12, which in turn are attached to the primary structure of aircraft fuselage 4 via connecting means of any kind.

In order to pass fastening devices 12 through insulation structure 6, openings or cutouts are necessary for this purpose, but these have the disadvantage that they might allow condensed water 14 to enter into aircraft cabin 2. This is particularly unacceptable if the escaping condensed water 14 drips onto persons 16 who are accommodated in passenger cabin 2. This undesirable phenomenon is also known by the term "rain in the plane".

Figure 1B:
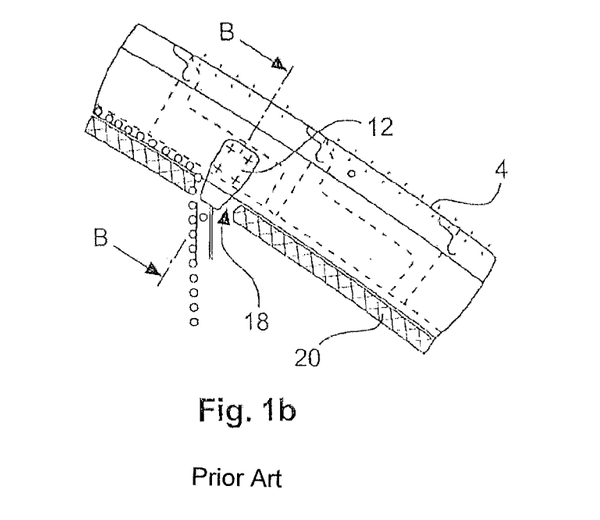

In FIG. 1b, a detail of the arrangement shown in FIG. 1a is depicted. Here, a fastening device 12 is shown that is secured to the primary structure of aircraft fuselage 4 and projects through cutout 18 of an insulation package 20, which is a component of insulating structure 6. Condensed water, which forms between the inner side of aircraft fuselage 4 and the outer side of insulation package 20, runs along the outer side of insulation package 20 under the force of gravity as far as cutout 18, and then runs along fastening device 12 to the lowest point thereof, where it then separates into drops of water and finally drips into cabin 2.

Figure 1C:
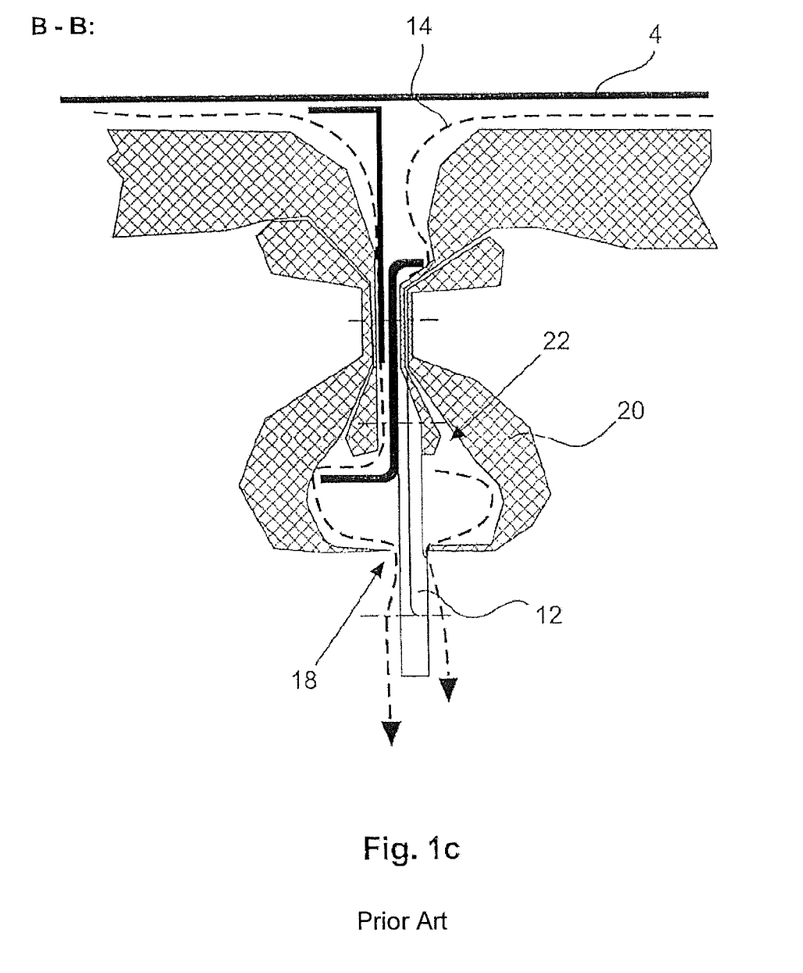

In FIG. 1c, the progressive course of condensed water 14 is shown somewhat more precisely with the aid of a sectional representation of fastening device 12 and the affected insulation package 20. Condensed water 14 that collects on the inside of fuselage 4 runs along an outer side 22 of insulation package 20, propelled by the force of gravity towards fastening device 12 that insulation package 20 touches in the area of cutout 18. Through this contact, condensed water 14 is caused to follow the force of gravity while remaining attached to fastening device 12, so that condensed water 14 runs to the lowest point of fastening device 12 and initially remains suspended there due to adhesion forces. As more condensed water 14 continues to run along the same course, drops of condensed water consequently become detached, such that condensed water enters into the cabin.

Figure 2:
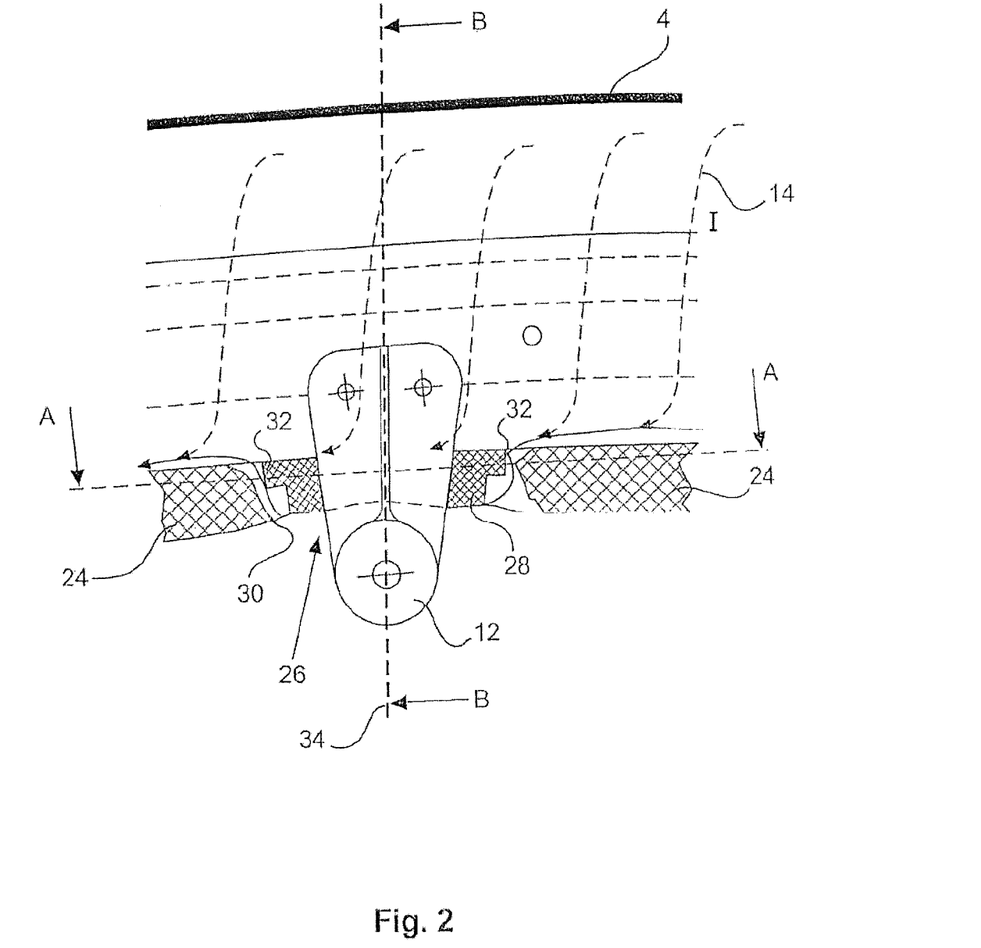
FIG. 2 shows a sectional view of an insulation package and fastening device according to an embodiment of the invention.

In FIG. 2, an insulation package 24 according to an embodiment of the invention is shown that comprises a cutout 26, through which in this illustration a fastening device 12 passes. An insulating element 28 is arranged in the area of cutout 26, and for exemplary purposes is permanently affixed to an envelope film 30 on an outer side of insulation package 24. A connection with this rear side of insulation package 24 may be created using self-adhesive designs, though other bonding options might also be considered, such as auxiliary adhesives, detachable connecting means such as bolts or clips, but also essentially non-detachable connecting means such as stitching and riveting.

The surface of insulating element 28 that faces outward, that is to say towards aircraft fuselage 4, comprises a plurality of spacers 32, which support the function maintaining a distance between insulation package 24 and fastening device 12. This collar-like structure prevents condensed water from running onto the top side of insulating element 28 and reaching the point where it is able to penetrate the mounting. In this way, condensed water is prevented from passing through cutout 26 in insulation package 24 and towards the aircraft cabin.

In FIG. 2, insulating element 28 is shown to be arranged perpendicularly to a longitudinal axis 34 of cutout 26 for exemplary purposes, that is to say it runs approximately perpendicularly to a longitudinal axis 34 of cutout 26 and is positioned essentially in the same plane as an area of the insulation package that is directly adjacent to the fastening device.

Condensed water 14 that forms on the inner side of aircraft fuselage 4 comes into contact with the outer side of the insulation package 24 according to an embodiment of the invention, which faces towards aircraft fuselage 4, where it essentially flows around insulating element 28 because of the separation, with the result that it does not come into contact with fastening device 12.

Figure 3:
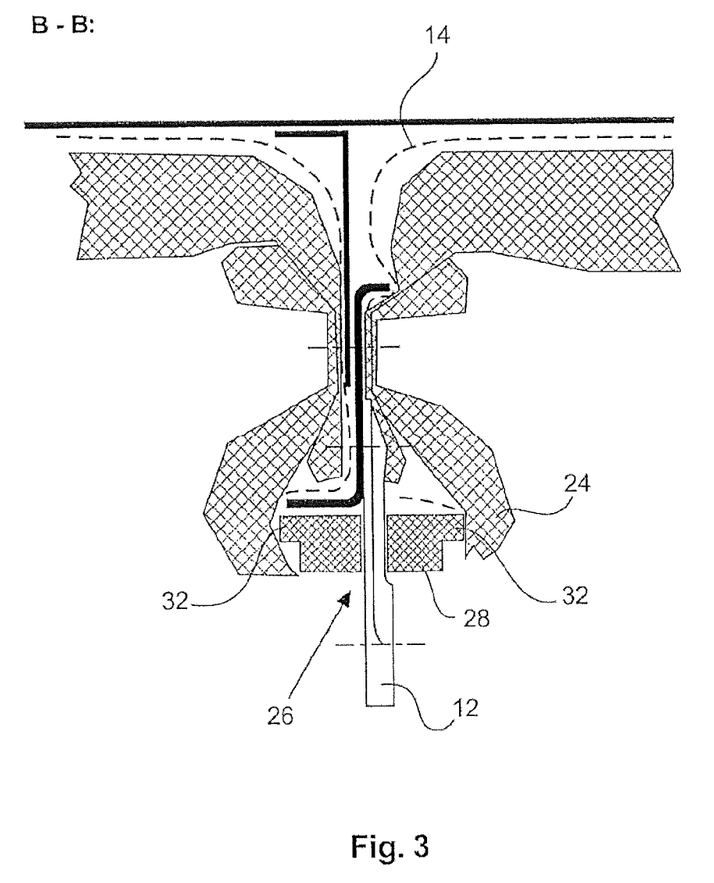
FIG. 3 shows another sectional view of an insulation package and fastening device according to an embodiment of the invention.

This is shown more precisely in FIG. 3, in which a section through longitudinal axis 34 of cutout 26 is shown. Here it is clearly demonstrated that a significantly greater separation between insulation package 24 and fastening device 12 may be achieved with the aid of insulating element 28, so that the path of condensed water to fastening device 12 is significantly longer than flowing round insulating element 28.

Figure 4:
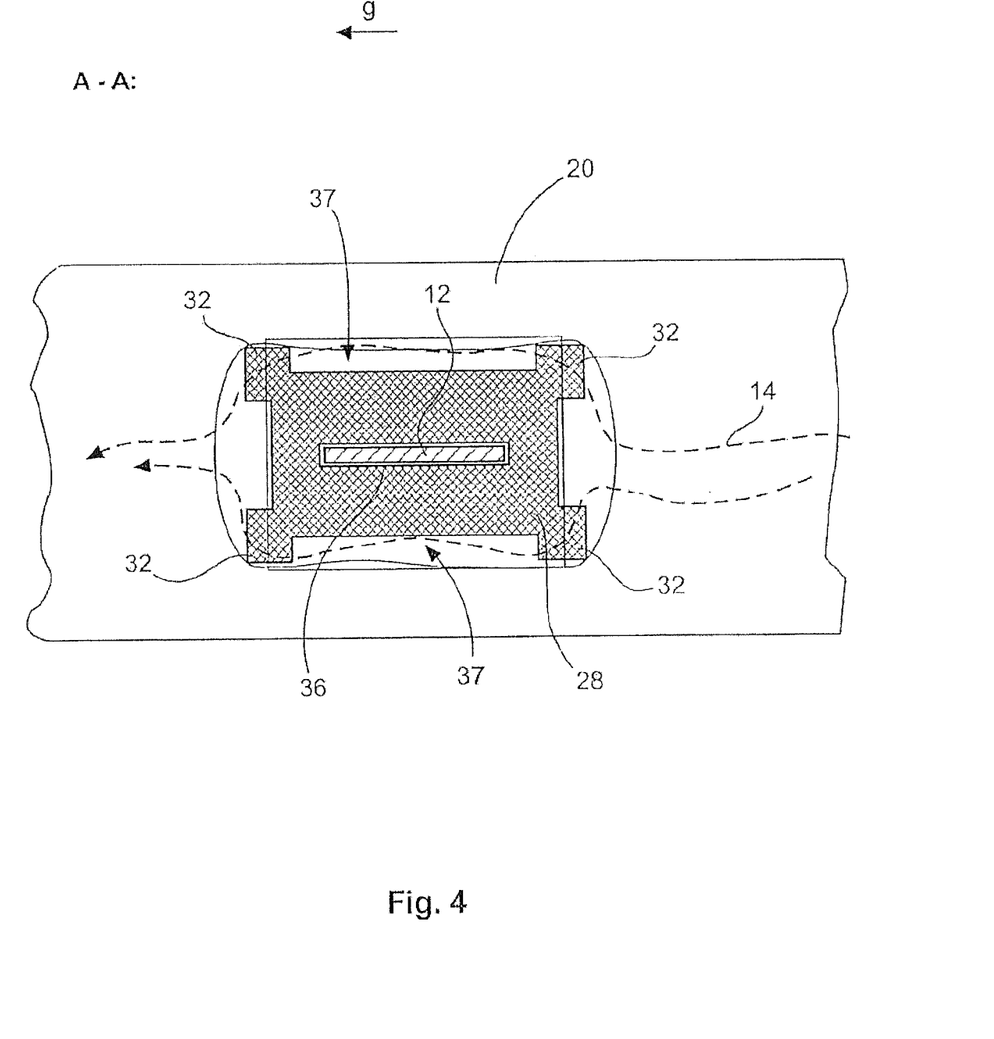
FIG. 4 shows a sectional plan view of an insulation package and fastening device according to an embodiment of the invention.

FIG. 4 shows a sectional plan view of the insulation package 24 according to an embodiment of the invention with an insulating element 28 attached thereto, rectangular for exemplary purposes, and with a spacer 32 disposed at each corner thereof. Insulating element 28 also has an opening 36 that corresponds to cutout 26 in insulation package 20 and allows a fastening device 12 to pass through.

Opening 36 in insulating element 28 may be formed in such manner that a force-fit engagement of insulation package with fastening device 12 is effected, so that any additional devices for securing insulating element 28 may be dispensed with.

As is particularly clearly shown in this illustration, as a result of insulating element 28 with spacers 32 the distance between fastening device 12 and the insulation package or the area of insulation package 20 that comprises insulating material is so great that the condensed water 14 that flows past insulating element 28 does not come into contact with fastening device 12. The provision of spacers 32 may also serve to form a groovelike, troughlike, or dam shape 37, which represents an even greater barrier to the passage of condensed water 14 as far as fastening device 12.

Without departing from or unnecessarily limiting the subject-matter of the invention, an insulating element 28 in its own right may also be used as an extension of an existing, conventional insulation package 20, in order to enable the same effect of diverting condensed water around fastening device 12. Accordingly, insulating element 28 does not necessarily have to be an integral component of an insulation package 20 or 24, it may also be used separately therefrom.

The condensed water that runs past fastening devices 12 finally makes its way below the cabin area in the aircraft and drains into the aircraft's bilge.

Figure 5A:
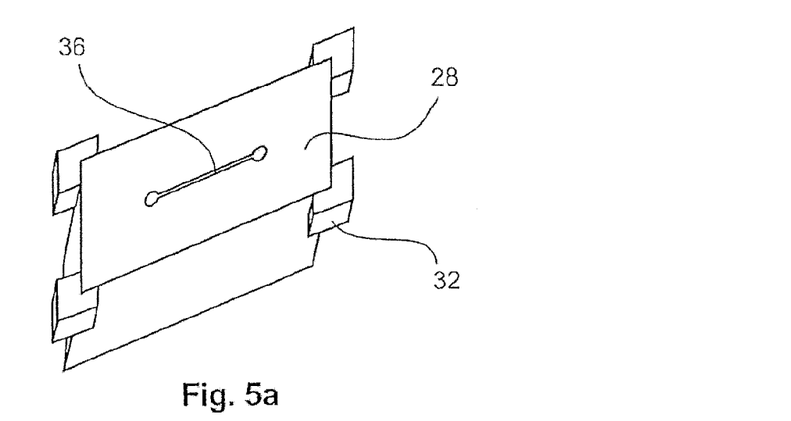
FIGS. 5a to 5c show exemplary insulating elements for use in or on an insulation package according to an embodiment of the invention.
Figure 5B:
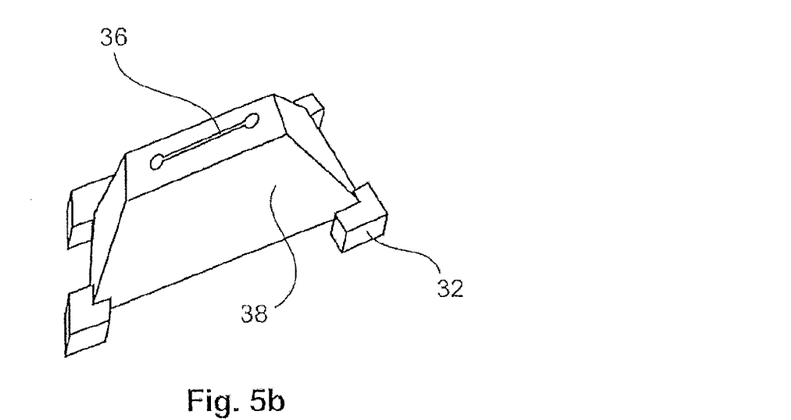
Figure 5C:
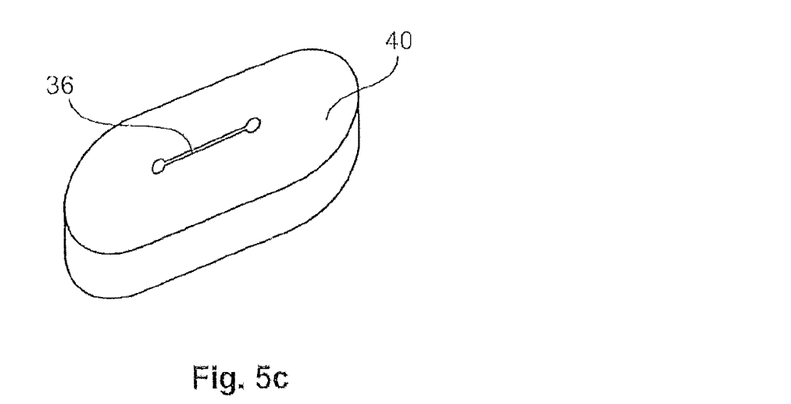

As is shown in FIGS. 5a-5c, other shapes may also be considered for insulating elements 28, they do not necessarily have to be rectangular and flat. For example, FIG. 5b shows an insulating element 38 with a pyramid shape, which may advantageously be used with or without additional spacers 32. At the same time, as shown in FIG. 5c, oval insulating elements 40 may also be considered.

Figure 6A:
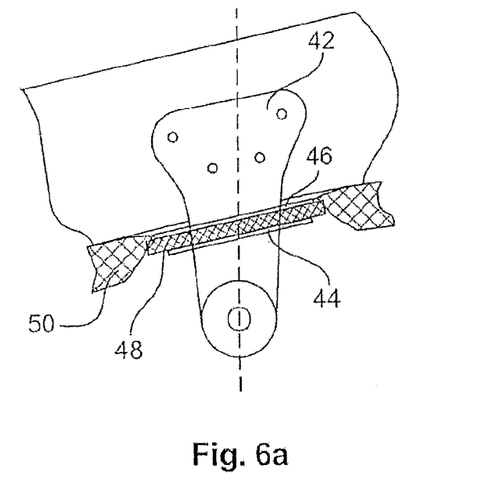
FIGS. 6a-6d show various views of a fastening device according to an embodiment of the invention.

FIG. 6a shows a modified fastening device 42, having for exemplary purposes two protrusions 44 and 46 for retaining an insulating element 48. The use for example of a closed-cell foam for an insulating element 48, causes insulating element 48 to press against protrusions 46 and 44 and thus produces an improved seal and a firm seating of insulating element 48. In this way, it may be possible to create both a retaining function for an insulation package 50 attached to insulating element 48 and improved protection from condensed water drops.

In the example shown, insulating element 48 is designed in such manner that it extends significantly beyond protrusions 44 and 46 and thus forms a kind of plateau.

Figure 6B:
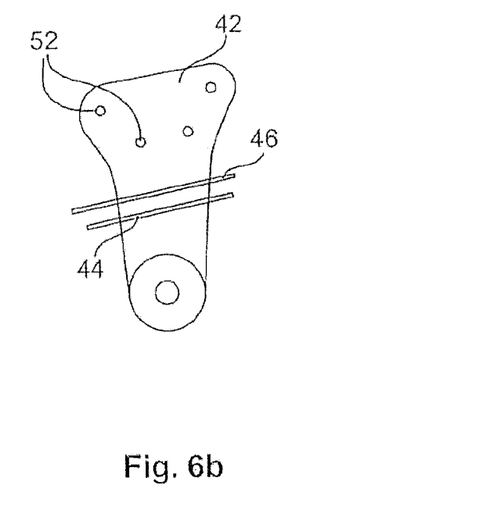

FIG. 6b shows a fastening device 42 according to an embodiment of the invention and protrusions 44 and 46 thereof, but without in inserted insulating element 48. The upper side of the fastening device 42 according to an embodiment of the invention has for example drill holes 52 for securing the fastening device 42 according to an embodiment of the invention to a vehicle structure, wherein protrusion 46 closer to drill holes 52 is wider than the protrusion 44 farther away from the drill holes, which enables insulating element 48 to be attached to fastening device 42 more effectively from a side opposite the side with the drill holes 52 that is attachable to the fuselage structure.

Figure 6C:
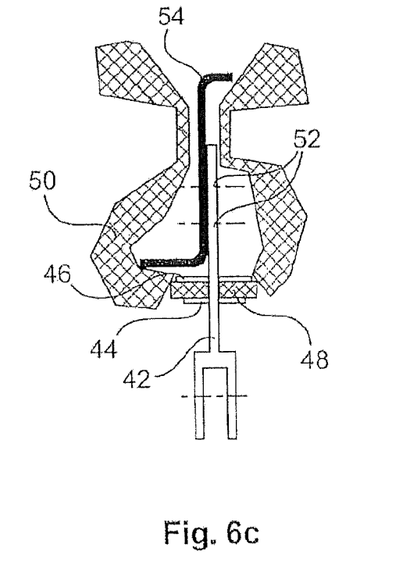

FIG. 6c shows the fastening device 42 according to an embodiment of the invention in an installed state on a reinforcing component 54, which may be realized as a stringer, for example. It is clearly shown that insulation package 50 is located at a greater distance from fastening device 42 and creates a gap with the aid of which condensed water may be prevented from reaching fastening device 42 and subsequently falling in drops.

Figure 6D:
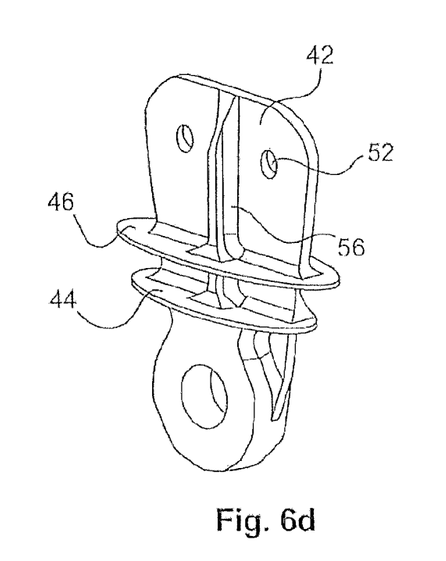

FIG. 6d shows a three-dimensional view of the fastening device 42 according to an embodiment of the invention, wherein only two drill holes 52 are represented for exemplary purposes. In the example shown, the fastening device 42 according to the invention has a lengthwise reinforcing element 56 to increase the stiffness of the fastening device 42 according to an embodiment of the invention.

Figure 7A:
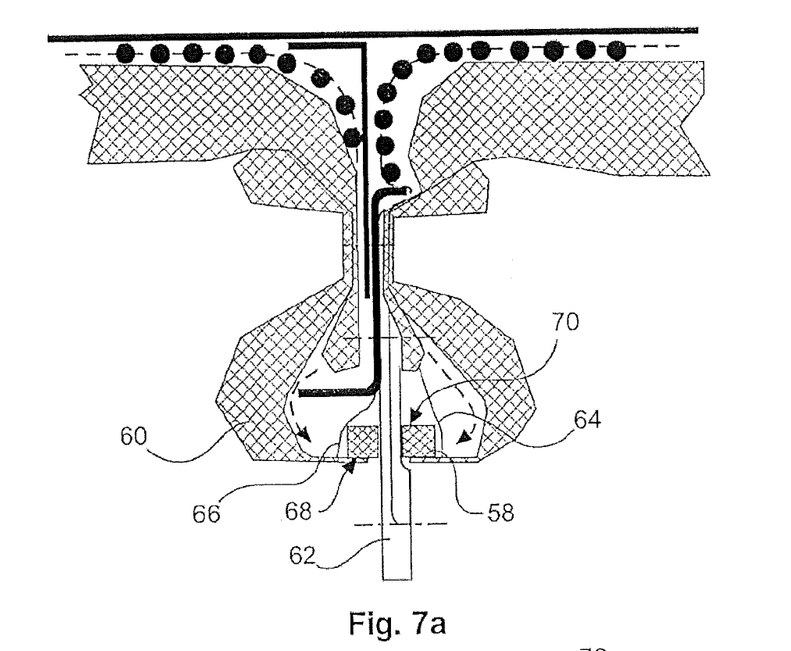
FIGS. 7a-7c show the arrangement of at least one protective film.

FIG. 7a shows a further embodiment, in which an insulating element 58 is used to create a gap between insulation package 60 and a fastening device 62, wherein this arrangement is supplemented with two protective films 64 and 66, which extend from an area of insulation package 60 close to insulating element 58 as far as the fuselage structure in the form of a reinforcing element 54. In this way, insulating element 58 is shielded from any condensed water that forms, so that opening 68 and cutout 70 are protected yet more effectively from the passage of condensed water.

Figure 7B:
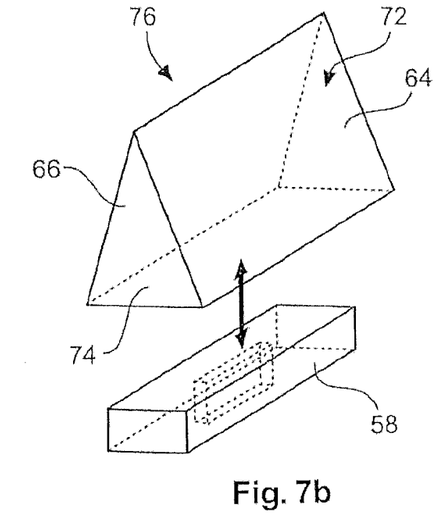
Figure 7C:
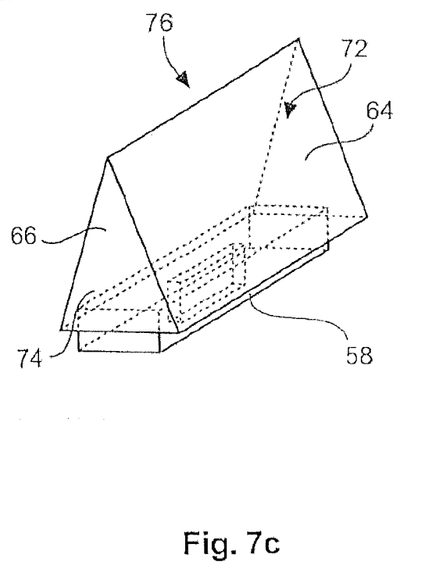

Films 64 and 66 do not necessarily have to be integrated separately from one another, instead, as in shown for exemplary purposes in FIGS. 7b and 7c, they may form a protective covering made up of multiple parts, which may be placed over insulating element 58. For this purpose, both protective films 64 and 66 are supplemented with additional film sections 72 and 74 to form a wedge-shaped protective covering 76 that has a larger base area than the insulating element 58 that is to be covered. In this way, drops of condensed water that occur may be very effectively directed around insulating element 58.

The material of an insulating element is preferably in the form of a closed-cell foam that does not allow absorption of condensed water, as a result of which fastening device 12 is kept almost completely dry, no excessive weight increase is caused throughout the entire vehicle cabin, and further protection against corrosion is provided.

Figure 8:
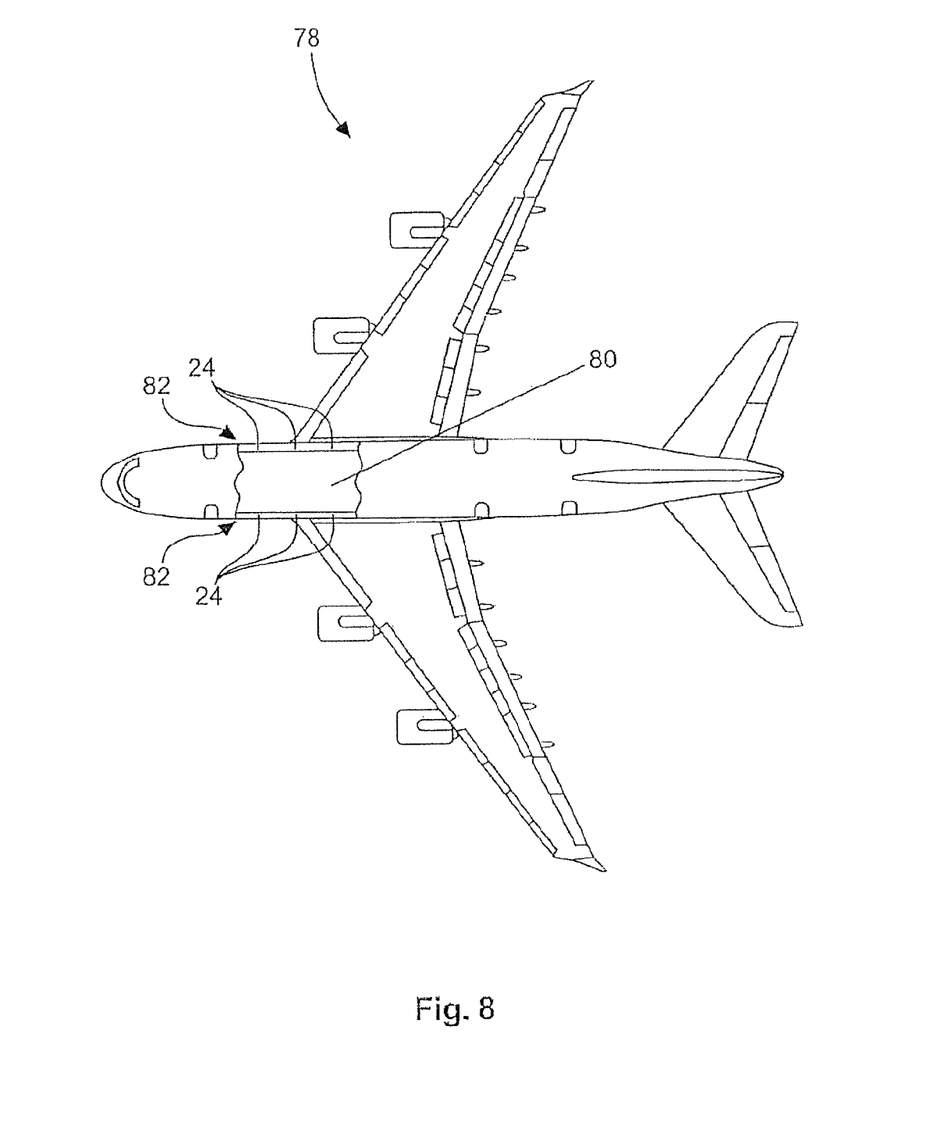
FIG. 8 shows an aircraft having at least a vehicle cabin and at least one insulation structure with at least one insulation package according to an embodiment of the invention.

Finally, in FIG. 8 an aircraft 78 is shown for exemplary purposes having at least a passenger cabin 80 that is thermally and acoustically insulated with an insulating structure 82, wherein insulating structure 82 includes at least one inventive insulation package 24 with an insulating element or one insulation package 24 and at least one insulating element according to an embodiment of the invention, through which a fastening device may be passed.

The particular advantages of the invention reside in the fact that the risk of condensed water penetrating as far as the aircraft cabin is significantly reduced, which improves the comfort of the passengers. The thermal and acoustic insulation effect in the area of fastening devices is optimized and the occurrence of condensed water in the aircraft is generally reduced by the improved sealing effect, which in turn reduces weight and the risk of corrosion. The design engineering explanations for avoiding "rain in the plane" are implemented only in the fuselage insulation, which is of great advantage not only for manufacturing the aircraft, but also for inexpensive modifications to aircraft already in existence.

In addition, it should be noted that "including" does not exclude any other elements or steps, and "one" does not preclude a plurality. It should further be noted that features that have been described with a reference to one of the preceding embodiments may also be used in combination with other features of other embodiments described in the preceding. Reference numbers indicated in the claims are not to be interpreted as limiting.

LEGEND

2 Aircraft cabin
4 Aircraft fuselage
6 Insulating arrangement
8 Hatrack
10 Cabin side paneling
12 Fastening device
14 Condensed water
16 Person
18 Cutout
20 Insulation package
22 Outer side
24 Insulation package
26 Cutout
28 Insulating element
30 Envelope film
32 Spacer
34 Longitudinal axis
36 Opening
37 Groovelike, troughlike, dam shape
38 Insulating element
40 Insulating element
42 Fastening device
44 Protrusion
46 Protrusion
48 Insulating element
50 Insulation package
52 Drill hole
54 Reinforcing component
56 Longitudinal reinforcing element
58 Insulating element
60 Insulation package
62 Fastening device
64 Protective film
66 Protective film
68 Opening
70 Cutout
72 Film section
74 Film section
76 Protective covering
78 Aircraft
80 Passenger cabin
82 Insulation structure

The invention claimed is:

1. An insulation package in a vehicle cabin for thermal and acoustic insulation of the vehicle cabin and having a cutout to allow a fastening device to pass through, the package comprising:

an insulating element disposed within an area of the cutout of the insulation package, and having an opening corresponding to the cutout to allow the fastening device to pass through, wherein at least part of the insulating element in the cutout extends perpendicularly to an axis of the cutout and the insulation package is aligned so as to create a first gap between a fastening device that has passed through and the insulation package; and wherein a second gap is created between the insulation package and the insulation element.

2. The insulation package of claim 1, further comprising an envelope film made from an insulating material, wherein the insulating element is placed on top of the envelope film.

3. The insulation package of claim 1, wherein the insulating element is surrounded by an envelope film and integrated in an insulating material.

4. The insulation package of claim 1, wherein the insulating element comprises at least one spacer.

5. The insulation package of claim 4, wherein the spacer comprises a collar extending at least partly round the periphery of the insulating element.

6. The insulation package of claim 4, wherein the spacer extends outwardly from the insulation package.

7. The insulation package of claim 1, wherein the insulation package at least partly forms a groove in the area surrounding the cutout.

8. The insulation package of claim 1, wherein the insulating element has a shape tapering constantly with increasing distance from the upper side of the insulation package.

9. The insulation package of claim 1, further comprising at least one protective film that in order to shield against condensed water is configured such that the protective film is securable to a vehicle structure, and in an area of the insulating element.

10. The insulation package of claim 1, wherein the insulating element is made from a closed-cell foam.

11. An aircraft having a fuselage, a cabin with cabin components and fastening devices for retaining the cabin components in the aircraft fuselage and an insulating structure having at least one insulation package having a cutout to allow a fastening device to pass through, the at least one insulation package comprising:

an insulating element disposed within an area of the cutout of the insulation package, and having an opening corresponding to the cutout to allow the fastening device to pass through, wherein at least part of the insulating element in the cutout extends perpendicularly to an axis of the cutout and the insulation package is aligned so as to create a first gap between a fastening device that has passed through and the insulation package; and wherein a second gap is created between the insulation package and the insulation element.

\* \* \* \* \*